(12) United States Patent
Weckerling et al.

(10) Patent No.: US 8,216,075 B2
(45) Date of Patent: Jul. 10, 2012

(54) JOINT ARRANGEMENT WITH CAGE OFFSET

(75) Inventors: Thomas Weckerling, Bonn (DE); Ida Hassenrik, Troisdorf (DE); Nader Khoshoei, Lohmar (DE); Jose Manuel Cubert, Gipuzkoa (ES)

(73) Assignee: GKN Driveline International GmbH, Lohmar (DE)

( * ) Notice: Subject to any disclaimer, the term of this patent is extended or adjusted under 35 U.S.C. 154(b) by 241 days.

(21) Appl. No.: 12/521,673

(22) PCT Filed: Nov. 28, 2007

(86) PCT No.: PCT/EP2007/062938
§ 371 (c)(1),
(2), (4) Date: Sep. 30, 2009

(87) PCT Pub. No.: WO2008/080709
PCT Pub. Date: Jul. 10, 2008

(65) Prior Publication Data
US 2010/0323802 A1    Dec. 23, 2010

(30) Foreign Application Priority Data
Dec. 29, 2006   (DE) .................. 10 2006 062 571

(51) Int. Cl.
*F16D 3/224* (2011.01)
(52) U.S. Cl. ...................... 464/145; 464/906
(58) Field of Classification Search .............. 464/140, 464/145, 906
See application file for complete search history.

(56) References Cited

U.S. PATENT DOCUMENTS

| | | | | |
|---|---|---|---|---|
| 1,975,758 A | * | 10/1934 | Stuber | 464/145 |
| 2,875,600 A | * | 3/1959 | Miller, Jr. | 464/145 |
| 4,331,005 A | | 5/1982 | Hirai et al. | |
| 5,616,081 A | | 4/1997 | Krude et al. | |
| 6,672,965 B2 | | 1/2004 | Hildebrandt et al. | |
| 7,112,140 B2 | | 9/2006 | Weckerling | |
| 7,396,285 B2 | * | 7/2008 | Weckerling | 464/145 |
| 2004/0137991 A1 | | 7/2004 | Weckerling | |
| 2008/0248885 A1 | | 10/2008 | Jacob | |

FOREIGN PATENT DOCUMENTS

| | | |
|---|---|---|
| DE | 103 37 612 A1 | 6/2004 |
| JP | 57 061822 A | 4/1982 |
| WO | WO 2006/048032 A1 * | 5/2006 |
| WO | WO-2007039293 A | 4/2007 |

OTHER PUBLICATIONS

First Office Action dated Jun. 23, 2011 from Chinese Applicaiton No. 200780048711.4 and English translation of same.
PCT International Search Report for PCT/EP2007/062938 dated Mar. 4, 2008.

* cited by examiner

*Primary Examiner* — Gregory Binda
(74) *Attorney, Agent, or Firm* — Rader, Fishman & Grauer, PLLC

(57) ABSTRACT

A joint arrangement in the manner of a counter track joint, wherein a cage is provided which is arranged between a joint outer part and joint inner part, which has a cage outer sphere with an outer sphere centripetal point and a cage inner sphere with an inner sphere center point and which has a plurality of cage windows which each hold at least one ball, wherein at least the outer sphere center point and the inner sphere center point of the cage are arranged offset with respect to the joint center plane.

9 Claims, 6 Drawing Sheets

JOINT ARRANGEMENT WITH CAGE OFFSET

CROSS-REFERENCE TO RELATED APPLICATIONS

This application is a national stage application of PCT/EP2007/062938 filed on Nov. 28, 2007, which claims priority to German Application No. DE10 2006 062 571.4 filed on Dec. 29, 2006, which applications are incorporated herein in their entirety.

FIELD

The present disclosure relates to a joint arrangement for a motor vehicle, in particular what is referred to as a counter track joint as a fixed joint. The joint arrangement generally comprises a joint outer part, a joint inner part, a plurality of torque-transmitting balls and a cage. A characteristic of a counter track joint is that track pairs, configured in a variety of ways, with the joint outer part and the joint inner part are formed which form angles of aperture on opposite sides of the constant-velocity joint.

BACKGROUND

Counter track joints are basically known from DE 102 20 711 A1 in which joints with 6 balls or 8 balls are presented. Here, the type of ball tracks corresponds to the type known per se from Rzeppa Joints (RF joints) and from the undercut free joints (UF joints). This means that the center lines of the ball tracks are composed of uniform radii (RF joint) and that the latter are made up of radii and straight elements which are parallel to the axis (UF joint).

In the counter track joints described, the axial opening directions of the track pairs alternate over the circumference, which gives rise to the counter track joint type. These known counter track joints are, however, limited to approximately 45° with respect to their articulation angle, because if this articulation angle is exceeded, a first ball in the joint articulation plane leaves the first track pairs.

DE 103 37 612 A1 also discloses ball track joints in which the track center lines of the first track pairs (which have an angle of aperture whose opening direction points towards the base of the joint when the joint is extended) are configured in such a way that the angle of aperture experiences a reversal of its opening direction when the joint is articulated starting from a certain articulation angle. This is implemented in particular by virtue of the fact that the track center lines of the ball tracks of the first track pairs are S-shaped and thus each have a turning point.

DE 100 60 220 A1 discloses, inter alia, counter track joints in which the center lines of the first outer ball tracks have a turning point near to the joint opening so that the center lines of the first outer ball tracks are S-shaped. The same applies to the center lines of the first inner ball tracks of the joint inner part owing to the consideration of symmetry. The maximum articulation angle of these counter track joints could thus be increased further.

Finally, reference is made to a counter track joint with a track turning point such as is described in WO 2006/048032. The counter track joint described therein is intended to be used in particular to reduce the friction between the ball cage and joint outer part or joint inner part. For this purpose, it is proposed that the track center lines of the first track pairs each have a turning point and that the center point angle in the turning points in relation to the joint center plane is greater than 4 degrees in each case. This ensures that the joint operates as a counter track joint in service life operation. Service life operation is considered to be operation within the service life angle at which the service life of the joint is reached without damage under alternating load.

With respect to the known joint arrangements there is also the need for a higher loadability, in particular in the case of simultaneously high articulation angles. At the maximum articulation angle, the balls move to a front edge of the surrounding outer part and there they can leave the cage which is guiding them. Furthermore, there are joint arrangements in which the front cross section of the ball cage is weakened by a particularly large mounting bore which is required to mount the inner race. Finally, the ball track depth which can be achieved with such joints and which also influences the service life of the joint does not always meet the requirements which are set. This is the case in particular with ball tracks which open towards the shaft when the joint arrangement is extended. With this type of ball track the depth of the ball track is greatly reduced in the internal region of the joint outer part.

SUMMARY

A joint arrangement is disclosed herein. Further embodiments of the joint arrangement are specified in dependently formulated patent claims. It is to be noted that the features which are specified individually in the dependent claims may be combined with one another in any desired technologically appropriate way and define further embodiments of the disclosure.

One exemplary joint arrangement according to the disclosure includes the following components: a joint outer part which has a connection side, an opening side and a cavity which is bounded by an inner face, as well as first outer ball tracks and second outer ball tracks which extend on the inner face between the connection side and the opening side, a joint inner part which is positioned in the cavity in the joint outer part and has a connection mechanism for a shaft which runs in the direction of the opening side of the joint outer part as well as first inner ball tracks and second inner ball tracks which extend on an outer face, wherein, on the one hand, in each case a first outer ball track and a first inner ball track form a first track pair, and, on the other hand, in each case a second outer ball track and a second inner ball track form a second track pair with one another. When the joint arrangement is extended, the first track pair forms a first angle of aperture in a joint center plane towards the connection side of the joint outer part, and the second track pair form a second angle of aperture in the joint center plane towards the opening side of the joint outer part, a ball in each track pair, a cage which is also arranged in the cavity between the joint outer part and joint inner part and has a cage outer sphere with an outer sphere center point and a cage inner sphere with an inner sphere center point, and which has a plurality of cage windows which each hold at least one ball, and in addition at least the outer sphere center point and the inner sphere center point of the cage are arranged offset with respect to the joint center plane.

The constant-velocity joint here is in particular a joint of the type of what is referred to as a counter track joint. In this respect it is possible to refer back to the entire contents of the introductory remarks on the prior art and the explanations contained therein regarding the definition of the counter track joint, all of which are expressly incorporated by reference.

With respect to the joint outer part, in one particular embodiment, it is to be noted that it is generally of a bellshaped design, with the side from which the cavity can be reached constituting the opening side. The axially opposite side is referred to as the connection side.

While the cavity has a shape which generally corresponds to that of a bell, an even number of outer ball tracks, for example six, eight, ten or else twelve, are generally arranged on the inner face of said cavity, six or eight ball tracks being preferred. These ball tracks are inserted into the joint outer part from the cavity in the manner of depressions. In this context it is then to be noted that these ball tracks have two different embodiments so that they are referred to as first and second outer ball tracks. In this context, the embodiment in which the first ball tracks and the second ball tracks are arranged alternately in the circumferential direction of the joint outer part is preferred, though both embodiments are disclosed.

The joint inner part is generally embodied in the manner of an inner race, the central region having an opening in which, for example, a shaft can be held in order to transmit a torque. In this context, the opening can also be designed to implement a wedge-groove connection or the like with the shaft. The joint inner part also has an outer face which has a relatively complex shape and into which ball tracks, which generally run in an axial direction, also extend. The number of inner ball tracks corresponds to the number of outer ball tracks, with the assignment of the first and second ball tracks also being clearly predefined.

If the joint inner part is positioned in the cavity of the joint outer part in a position such as occurs when a constant-velocity joint is extended (articulation angle=0°), it is apparent in various sectional planes through the longitudinal axis of the joint outer part, on the one hand, and the ball tracks, on the other, that in each case a first outer ball track and a first inner ball track form a pair of tracks, as do in each case a second outer ball track and a second inner ball track.

In the case of this counter joint, a plane which is perpendicular to the longitudinal axis of the joint outer part and runs through the joint center point should now be considered. Tangents to the points on the ball tracks in the joint center plane form here what is referred to as an angle of aperture. "Angle of aperture" is intended to express in particular the direction in which the angle opens. This then defines that the first track pairs form an angle of aperture towards the connection side and the second track pairs form an angle of aperture towards the opening side.

In addition, these track pairs each hold a torque-transmitting ball. Basically, the term "ball" is used as a global term for all suitable bodies which transmit torque. The cage which is positioned between the joint outer part and the joint inner part serves, during the operation of the joint, at least temporarily to guide the balls in the track pairs. The cage generally has as many cage windows as the number of balls which it holds, but it is also possible for a plurality of balls, in particular two, to be arranged in one cage window.

In order to implement a particularly large articulation angle, the first track pairs are then embodied with a first turning point with respect to their track centre line. In particular, this gives the track center line an S shape. This has the effect, in particular, that material from the joint outer part is removed near to the opening side and the balls can still be held in contact with the inner area of the joint outer part over a relatively large articulation angle.

In fact, with this particularly large articulation angle, in which the ball in the first track pairs is moved very far outward, there is corresponding displacement of the balls a very long way towards the inside in the second track pairs. In this context, it was possible for increased noise to be generated under high load in the durability range compared to known constant velocity joints, or even for a risk of component failure to be determined.

The joint arrangement according to the disclosure is accordingly equipped with a joint outer part with outer ball tracks and a joint inner part with inner ball tracks as well as balls (or comparable rolling bodies) for transmitting torque and a cage with a spherical inner face (cage inner sphere) and a spherical outer face (cage outer sphere). The center points of the spherical inner and outer faces (inner spherical center point and outer spherical center point) are each offset axially with respect to the cage center plane or joint center plane, in which case, if appropriate, a first outer ball track and a first inner ball track are arranged with a first track offset with respect to a joint center point, and a second outer ball track and a second inner ball track are arranged with a second track offset with respect to the joint center point. In this context, the first track pairs and second track pairs form opposed angles of aperture.

In this way, for the first time, a combination of a counter track joint and of a cage with what is referred to as a cage offset is proposed. In this way it is surprisingly possible to implement a number of advantages such as, for example, a thicker cage cross section in the opening area (higher strength), a smaller ball opening with the same articulation angle (enlargement of the articulation angle or mounting angle with better guidance), deepening of the track edge in the end area of the raceways of the outer part (longer service life).

For an explanation of the design and the function of the counter track joint, reference is made here to DE 102 20 711 A1, DE 103 37 612 A1, DE 100 60 220 A1 and WO 2006/048032, in which case reference can be made in particular to the entire scope of the explanations there related to the principle characterization of a counter track joint.

A joint arrangement in which the outer sphere centre point is offset in the direction of the opening side of the joint outer part and the inner sphere center point is arranged offset in the direction of the connection side of the joint outer part is preferred. Accordingly, the result is in particular that the cross section of the cage is strengthened or enlarged near to the opening side and as a result can bear heavy loading at large articulation angles. At the same time, the joint inner part is positioned or secured further towards the connection side, in the cavity compared to conventional counter track joints so that a deeper ball track is provided for high articulation angles.

According to one development of the joint arrangement, the first outer ball tracks form a first outer radius of curvature in the joint centre plane, and the first inner ball tracks form a first inner radius of curvature in the joint center plane, which radii of curvature each form an identically large first track offset, and in addition the second outer ball tracks form a second outer radius of curvature in the joint center plane, and the second inner ball tracks form a second inner radius of curvature in the joint center plane, which radii of curvature each form an identically large second track offset. It is basically possible for the first track offset and the second track offset to be of different sizes in terms of absolute value, but this is not absolutely necessary so that the first track offset and the second track offset can be (essentially) of identical size.

The cage which is configured in this way can be embodied with significantly larger cross section in critical areas, in particular when the spherical inner and outer faces have axial offsets in opposite directions. In particular, such a cage can be strengthened in the region of the opening side of the joint arrangement, where high loading of the cage occurs when the joint arrangement is articulated to a large degree. Together with a non-uniform offset of the inner and outer ball tracks, the ball tracks which are available for moving the balls within the joint arrangement can be enlarged so that the mobility and service life of the joint arrangement are improved.

Furthermore, it is considered advantageous that a first outer ball track offset of the first outer ball track and a second outer ball track offset of a second outer ball track differ by at least 50% and at most 150% of the distance between the outer sphere center point and the inner sphere center point of the cage. It is very particularly preferred for the difference to be precisely one distance (+/−5%).

In particular, in combination with this (but not necessarily), a first inner ball track offset of the first inner ball track and a second inner ball track offset of the second inner ball track differ by at least 50% and at most 150% of the distance between the outer sphere center point and the inner sphere center point of the cage. It is very particularly preferred for the difference to be precisely one distance (+/−5%).

In one exemplary and particularly preferred case, this means, compared to conventional counter track joints without a cage offset, that the first outer ball track offset and the first inner ball track offset are reduced by a half (50%) of a cage offset or distance, and the second outer ball track offset and the second inner ball track offset are enlarged by a half (50%) of a cage offset or distance. This particularly preferred embodiment of the disclosure with differing first ball track offset and second ball track offset provides a joint arrangement which permits large articulation angles at a high loadability and a long service life. In this context, in particular, the offset raceways produce relatively large ball track depths.

According to one development of the joint arrangement, the absolute values of the first angle of aperture and of the second angle of aperture differ from one another by at most 5 degrees. In one particularly advantageous and exemplary embodiment of the disclosure the angles of aperture have generally the same absolute value, but at most a deviation of at most 5 degrees, in particular at maximum only 2°. The angle of aperture (between the inner ball track and outer ball track in the region of the joint centre plane or the cage centre plane) is preferably in a range from 14° to 20° here.

Furthermore, a joint arrangement is preferred in which the first track pair forms a first track center line which has a first track turning point. In a front track area of the first track pair, the ball therefore carries out a S-shaped movement with respect to the joint outer part axis. For an explanation of the S-shaped profile it is possible to refer to the entire contents of the description in DE 100 60 220 A1, which is incorporated herein by reference. As a result it is possible to enlarge a ball track loop which becomes very important in states in which the joint is articulated.

A motor vehicle having at least one joint arrangement according to the disclosure is considered to be a particularly preferred possibility of use of the disclosure.

The suitability of the individual parts for a corresponding joint arrangement can also be detected from corresponding characteristics. They can be described by reference to the following inventive features:

A joint outer part for a joint arrangement which has a connection side, an opening side, a joint outer part axis, a cage center plane and a cavity which is bounded by an inner face, as well as first outer ball tracks and second outer ball tracks which extend on the inner face between the connection side and the opening side, wherein the first outer ball tracks and the joint outer part axis form a first angle of aperture towards the connection side of the joint outer part in the cage center plane, and the second outer ball tracks and the joint outer part axis form a second angle of aperture towards the opening side of the joint outer part in the cage center plane, and in addition the first outer ball tracks form a first outer radius of curvature in the cage center plane, and the second outer ball tracks form a second outer radius of curvature in the cage center plane, the center points of which radii of curvature are positioned asymmetrically with respect to a cage sphere plane of the joint outer part (that is to say the outer guide sphere for the cage).

A joint inner part for a joint arrangement which has a connection side, an opening side, a joint inner part axis, a cage center plane and first inner ball tracks and second inner ball tracks which extend on an outer face, wherein the first inner ball tracks and the joint inner part axis form a first angle of aperture towards the connection side of the joint inner part in the cage center plane, and the second inner ball tracks and the joint inner part axis form a second angle of aperture towards the opening side of the joint inner part in the cage center plane, and in addition the first inner ball tracks form a first inner radius of curvature in the cage center plane, and the second inner ball tracks form a second inner radius of curvature in the cage center plane, the center points of which radii of curvature are positioned asymmetrically with respect to the cage sphere plane of the joint inner part (that is to say the inner guide sphere for the cage).

With respect to the cage center plane it is to be noted that the latter position of the cage center plane in relation to the individual ball tracks can be assigned without difficulty in terms of measuring equipment. This geometric track point can be determined readily by a person skilled in the art. However, it is also necessary to clarify here that the angles of aperture between the axis and track have in each case different absolute values from the angles of aperture of the track pairs. Nevertheless, the latter are embodied correspondingly in terms of their orientation. The asymmetrical position of the center points of the radii of curvature positioned opposite is to be understood in particular in such a way that in each case the two center points are each arranged on a different side of the cage sphere plane, but at different distances from the cage sphere plane. In this context in particular (only) the distance in the direction of the respective axis is decisive, with both center points preferably lying on precisely this axis.

BRIEF DESCRIPTION OF THE DRAWINGS

Further advantages of the disclosure and the technical field are described with respect to the following exemplary embodiments and the drawings, without limiting the disclosure to the illustrated variants. At this point it is also to be noted that the reference symbols are used to the same extent for the same components in all the figures.

DESCRIPTION

Figure 1:
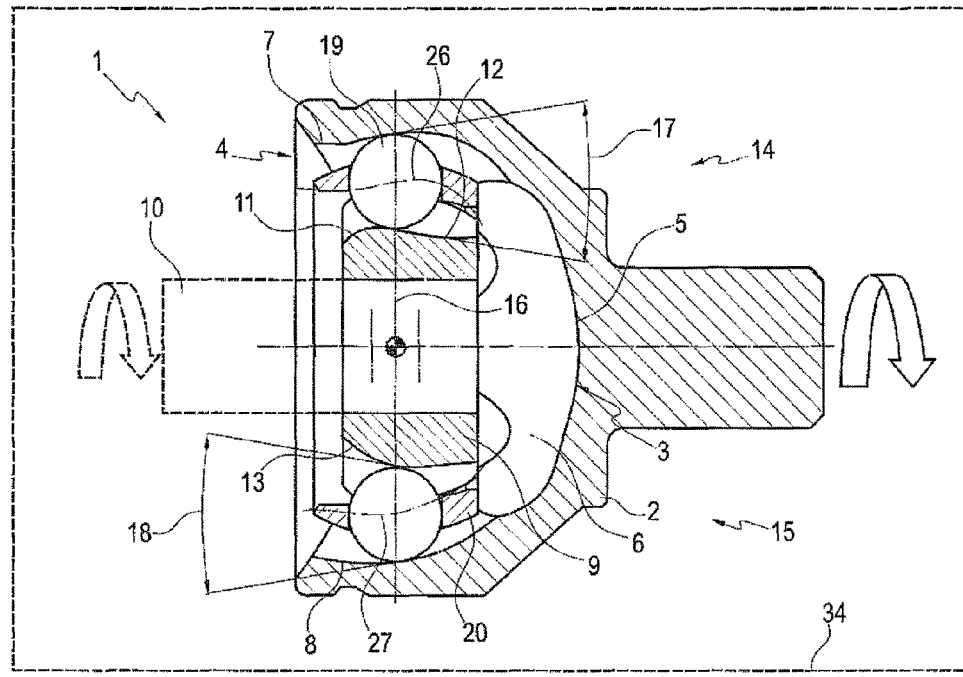
FIG. 1 shows a first embodiment variant of a constant-velocity joint in an extended position.

FIG. 1 serves primarily to illustrate the basic design of a constant-velocity joint in the manner of which the joint arrangement 1 is embodied here. The joint arrangement 1 has, as components, a joint outer part 2 and balls 19, a cage 20 and a joint inner part 9, which can be connected to a shaft 10, if appropriate. The torque is transmitted here from the inner ball tracks to the outer ball tracks via the balls 19.

The illustrated joint outer part 2 can be characterized by a connection side 3 and an opening side 4. Starting from the opening side 4, a cavity 6, which is configured generally in the shape of a bell here, extends into internal areas of the joint outer part 2. In addition, a plurality of outer ball tracks are formed on the inner face 5 of the joint outer part 2, there being two different types of outer ball tracks in the joint arrangement 1 in the manner of a counter track joint here. This is clear in particular from the fact that the sectional outer ball tracks of the joint outer part 2 have different contours at the top and at the bottom.

Furthermore, in the mounted state the joint inner part 9 is positioned in the cavity 6. Corresponding ball tracks, referred to as "inner" ones here are then formed on an outer face 11, which is therefore configured in the direction of the joint outer part 2. The joint inner part 9 is arranged in such a way that in each case the first outer ball tracks 7 and the first inner ball tracks 12 lie radially opposite one another, and thus form a first track pair 14. Owing to the identical design of the joint outer part 2 and joint inner part 9 with respect to the second inner ball tracks 13 and second outer ball tracks 8, the same applies to the second track pairs 15.

In order to characterize what is referred to as the counter track joint, the orientation of the angles 17, 18 of aperture of each track pair 14, 15 will now be used. In the extended position of the joint arrangement 1 (as represented here with an articulation angle=0°), the first track pairs 14 (illustrated above) form a first angle 17 of aperture towards the connection side 3 of the joint outer part 2 in a joint center plane 16. The second track pairs 15 (illustrated at the bottom) form, in contrast, a second angle 18 of aperture towards the opening side 4 of the joint outer part 2 in the joint center plane 16. Such opposed orientation of the angles 17, 18 of aperture leads to a situation in which the forces which act on the ball 19 act both towards the connection side 3 and towards the opening side 4. As a result, the movement sequence can be stabilized and the balls 9 can be guided with relatively low loading of the cage 20.

Such a joint arrangement 1 is used in particular to transmit a torque from a shaft 10 to the joint outer part 2, with the joint arrangement 1 being part of a motor vehicle 34, as indicated here.

Figure 2:
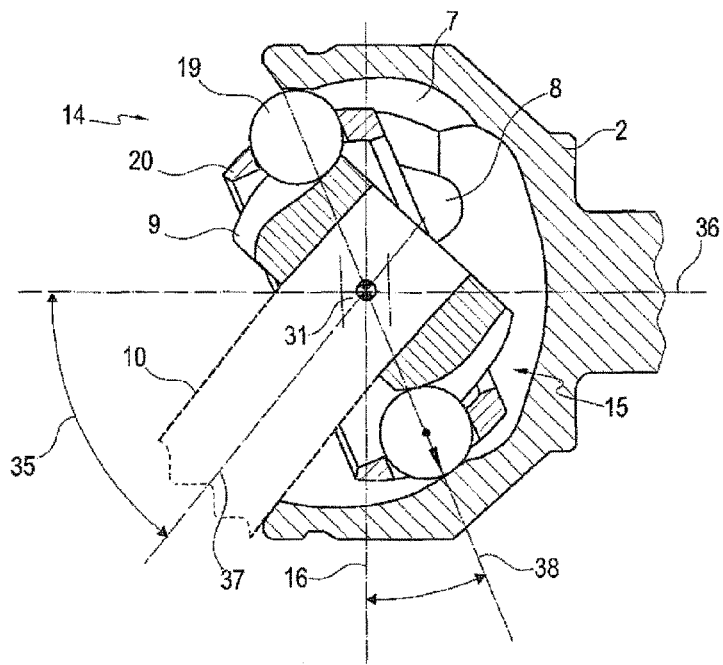
FIG. 2 shows the constant-velocity joint from FIG. 1 in an articulated position.

If the joint inner part is articulated, for example over the shaft 10, the center points of the balls 19 run on the track center line 26 or the second track center line 27. At the same time, the joint inner part 9, cage 20 and the shaft 10 are pivoted about the joint center part 31 with respect to the joint outer part 2, as is apparent from FIG. 2. Here, the joint arrangement 1 is illustrated with a maximum articulation angle 35 at which the shaft 10 comes into contact with the joint outer part 2. The articulation angle 35 is defined by the angle between the joint outer part axis 36 and the joint inner part axis 37. Owing to the relative movement of the components with respect to one another, when there is a maximum articulation angle 35 the ball plane 38 is made to pivot through the centre points of the balls 19 with respect to the joint centre plane 16 by half the maximum articulation angle 35. In this articulated position of the joint arrangement 1, it is also possible to recognize the first outer ball tracks 7 and second outer ball tracks 8 which are embodied differently and which are positioned alternately in the circumferential direction of the joint outer part 2. Basically, six, eight, ten, twelve or a different number of track pairs can be implemented.

Figure 3:
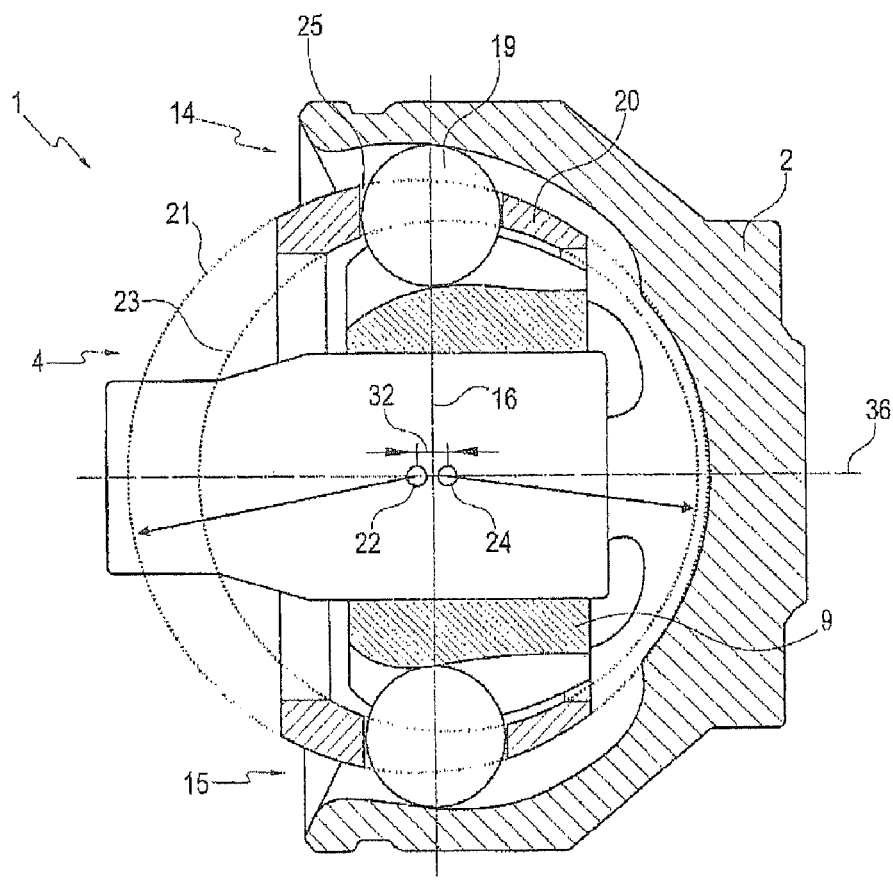
FIG. 3 shows a first embodiment variant of the joint arrangement according to the disclosure.

FIG. 3 shows a section through a further embodiment variant of the joint arrangement 1. In FIG. 3, the first track pair 14 of a counter track joint is illustrated at the top, and the second track pair 15 of a counter track joint is illustrated at the bottom. The shape of the cage 20, which has a separate cage window 25 for each ball 19, said cage windows 25 being distributed over the circumference, is also shown here. The cage 20, which is positioned between the joint outer part 2 and joint inner part 9, has a cage outer sphere 21 with an outer sphere center point 22, and a cage inner sphere 23 with an inner sphere center point 24. From FIG. 3 it is apparent that the outer sphere center point 22 and the inner sphere center point 24 are positioned at a distance 32 from one another on the joint outer part axis 36. This means, in other words, that the cage outer sphere 21 and the cage inner sphere 23 are not arranged concentrically with respect to one another. As a result, as illustrated here, the cage 20 is embodied with a thicker cross section in the region of the opening side 4. With respect to the position of the outer sphere center point 22 and of the inner sphere center point 24 with respect to the joint center plane 16 it is to be noted that the latter are embodied at the same distance from the joint center plane 16, and the distance 32 is therefore half that from the joint center plane 16.

Figure 4:
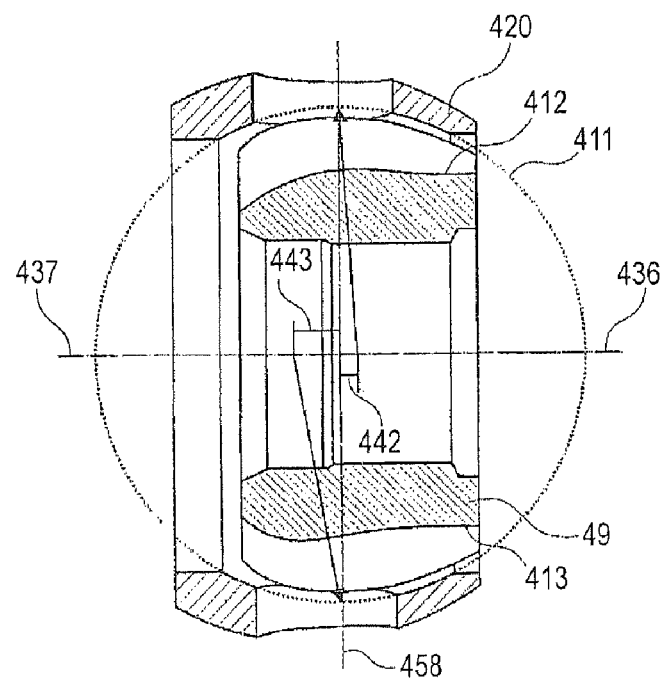
FIG. 4 is an illustration of a cage and of a joint inner part with different inner ball track offsets.

FIG. 4 shows a combination of a cage 420 with a cage offset and a correspondingly adapted joint inner part 49 with a first inner ball track 412 (at the top) and a second inner ball track 413 (at the bottom). The spherical outer face 411 of the inner part 49 is illustrated by a dotted circle. This sphere generally corresponds to the cage inner sphere 423 of the cage 420. The track base of the first inner ball track 412 has here a curvature whose curvature center point is positioned on the joint outer part axis 436, which at the same time constitutes the joint inner part axis 437 here when the joint arrangement is extended, while a first inner ball track offset 442 which is directed in the direction of the connection side 43 of the joint can be determined with respect to the cage sphere plane of the joint inner part 458. On the opposite side of the cage sphere plane of the joint inner part 458, a second inner ball track offset 443 with respect to the radius of curvature of the second inner ball track 413 is formed in an analogous fashion. In the embodiment variant illustrated here, the second inner ball track offset 443 is made larger than the first inner ball track offset 442.

Figure 5:
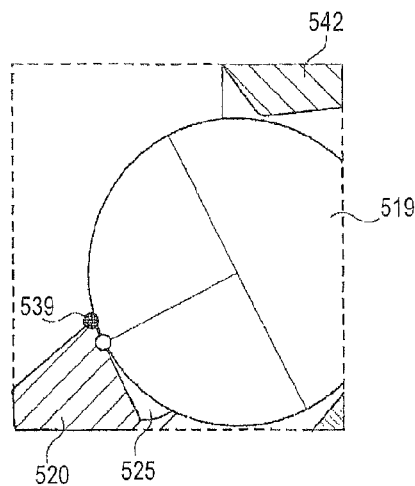
FIG. 5 is a detail of the contact of the ball and cage at a maximum articulation angle.

FIG. 5 then illustrates that when there is a maximum articulation angle the ball 519 is to a relatively large extent embraced by the cage 520. The ball 519 which is positioned in the cage window 525 forms here a contact point 539 with the cage 520. In the case of the previously thin cage 520, the latter was present in the vicinity of the white dot which is illustrated in FIG. 5. As a result of the use of a cage 520 with a cage offset, the contact point 539 migrates further outwards and is then located in the position illustrated here (black dot). This permits the ball 519 to be grasped in a significantly more stable way at high articulation angles.

Figures 6, 7:
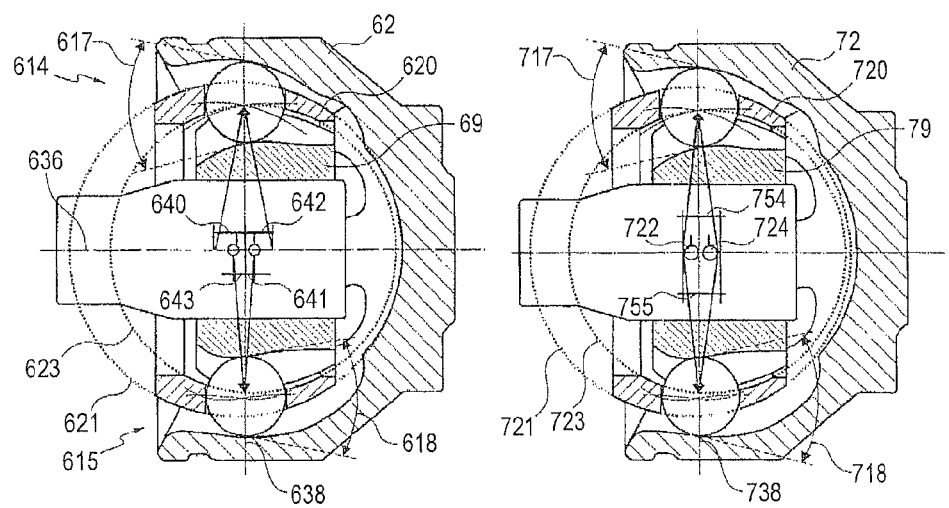
FIG. 6 is an illustration of a further embodiment variant of the joint arrangement with a cage offset and different track offsets.
FIG. 7 is a further embodiment of a joint arrangement according to the disclosure with an identical angle of aperture.

FIG. 6 shows an embodiment variant of a joint arrangement 61 in which a first angle 617 of aperture is formed with respect to the first track pair 614, and a second angle 618 of aperture is formed with respect to the second track pair 615. With respect to the first track pair 614 it is to be noted that the radius of curvature of the first outer ball track 67 forms a first outer ball track offset 640 with respect to the ball plane 638, and the radius of curvature of the first inner ball track 612 forms a first inner ball track offset 642. The first outer ball track offset 640 and the first inner ball track offset 642 of the first track pair 614 are configured so as to mirror-symmetrical with respect to the ball plane 638 and accordingly have the same absolute values. The second outer ball track offset 641 and the second inner ball track offset 643 are also formed in the same way. In the embodiment variant illustrated here, the first outer ball track offset 640 and the first inner ball track offset 642 are made larger in terms of absolute value than the second outer ball track offset 641 and the second inner ball track offset 643. Furthermore, the second outer ball track offset 641 and the second inner ball track offset 643 correspond essentially to the cage offset. Owing to the different configuration of the track offsets and the resulting relative position of the inner part 69, cage 620 and outer part 62, the first angle 617 of aperture and the second angle 618 of aperture are also made different from one another. In particular, with this configuration the first angle 617 of aperture is made larger than the second angle 618 of aperture. In other words, this also means that the centre points of the first and second radii of curvature of the joint outer part and of the joint inner part are positioned symmetrically with respect to the ball plane and cage centre plane, and the cage is provided with an offset.

With respect to FIG. 7, the respective ball track offset or track offset was, in contrast to FIG. 6, set in such a way (with identical absolute values) that ultimately the first angle 717 of aperture and the second angle 718 of aperture have the same absolute value (but opposed orientation). The cage offset is determined by the outer sphere center point 722 with the cage outer sphere 721 and the inner sphere center point 724 of the cage inner sphere 723. In other words, this means also that the center points of the first and second radii of curvature of the joint outer part and of the joint inner part are positioned asymmetrically in relation to the respective cage sphere plane, and the cage is provided with such an offset that ultimately symmetry is also established with respect to the angles of aperture.

Figure 8:
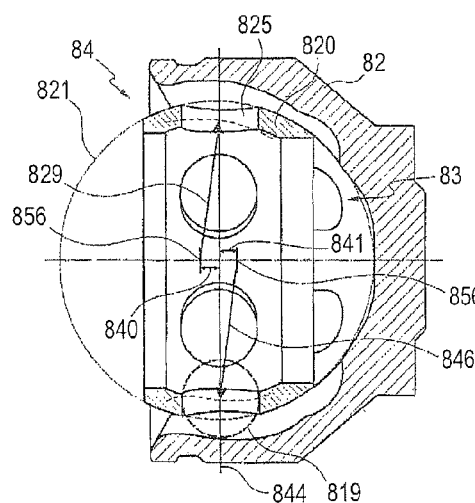
FIG. 8 shows a known embodiment of a joint outer part with a track offset and cage without a cage offset.

FIG. 8 shows the embodiments of a joint inner part 82 with a first outer ball track offset 840 and a second outer ball track offset 841. The first outer ball track offset 840 is formed with the centre point 856 of the first outer (central) radius 829 of curvature. The second outer ball track offset 841 is formed with the center point 856 of the second outer(central) radius 846 of curvature. For the sake of illustration, the position of a conventionally configured cage 820 without cage offset is also shown.

It is apparent that the ball 819 which is indicated is arranged in alignment with the cage center plane 844.

Figure 9:
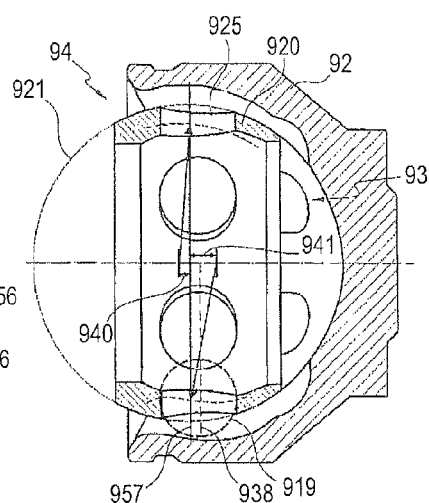
FIG. 9 shows an embodiment of the cage for a counter joint illustrating differences from the variant in FIG. 8.

In order then to illustrate an advantageous adaptation of the outer ball tracks, the cage 920 which is illustrated in FIG. 9 has a cage offset. This is illustrated in particular by virtue of the fact that the cage 920 is of thickened design in the region of the opening side 94 and, on the other hand, by virtue of the fact that the ball plane 938 through the center point of the indicated ball 919 is now offset with respect to the cage sphere plane of the joint outer part 957. In addition, in FIG. 9 it is illustrated that that the first outer ball track offset 940 is different from the second outer ball track offset 941 (or positioned asymmetrically with respect to the cage sphere plane of the joint outer part 957), in particular the second outer ball track offset 941 is larger than the first outer ball track offset 940. The combination of this modification of the outer ball tracks as a result, together with the cage offset, that in the mounted state of the counter track joint the ball center plane 938 passes through half the distance between the two outer ball track offsets 40, 41.

Figure 10:
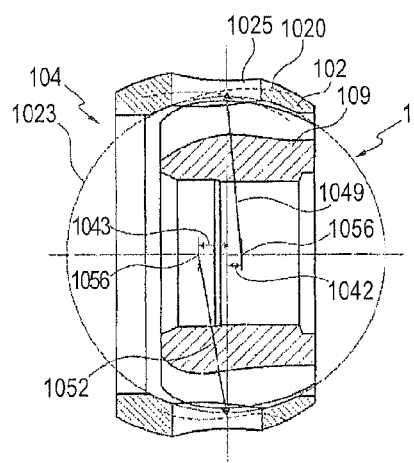
FIG. 10 shows a combination of a cage and joint inner part with a different inner ball track offset.

FIG. 10 shows a combination of a cage 1020 with a cage offset, and a joint inner part 109 is illustrated whose outer face 1011 corresponds essentially to the cage inner sphere 1023. In the illustrated variant, the second inner ball track offset 1043, which points in the direction of the opening side 104, is made larger than the first inner ball track offset 1042, which is formed with respect to the connection side 103. The first inner ball track offset 1042 is formed with the center point 1056 of the first inner (central) radius 1049 of curvature. The second inner ball track offset 1043 is formed with the center point 1056 of the second inner (central) radius 1052 of curvature.

Figure 11:
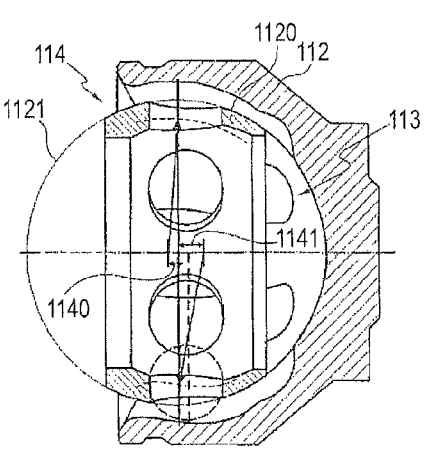
FIG. 11 shows a combination of a joint outer part and cage with a different outer ball track offset.

The situation regarding the orientation and size of the first outer ball track offset 1140 and of the second outer ball track offset 1141 in the combination of a joint outer part 112 and of a cage 1120 with cage offset as illustrated in FIG. 11 is converse. Here, the first outer ball track offset 1140 which is positioned closer to the opening side 114 is made smaller than the second outer ball track offset 1141.

It is preferred for the second inner ball track offset 1043 from FIG. 10 to correspond in absolute terms to the second outer ball track offset 1141 from FIG. 11, and also for the first inner ball track offset 1042 from FIG. 10 to correspond in absolute terms to the first outer ball track offset 1140 from FIG. 11.

Figures 12, 13:
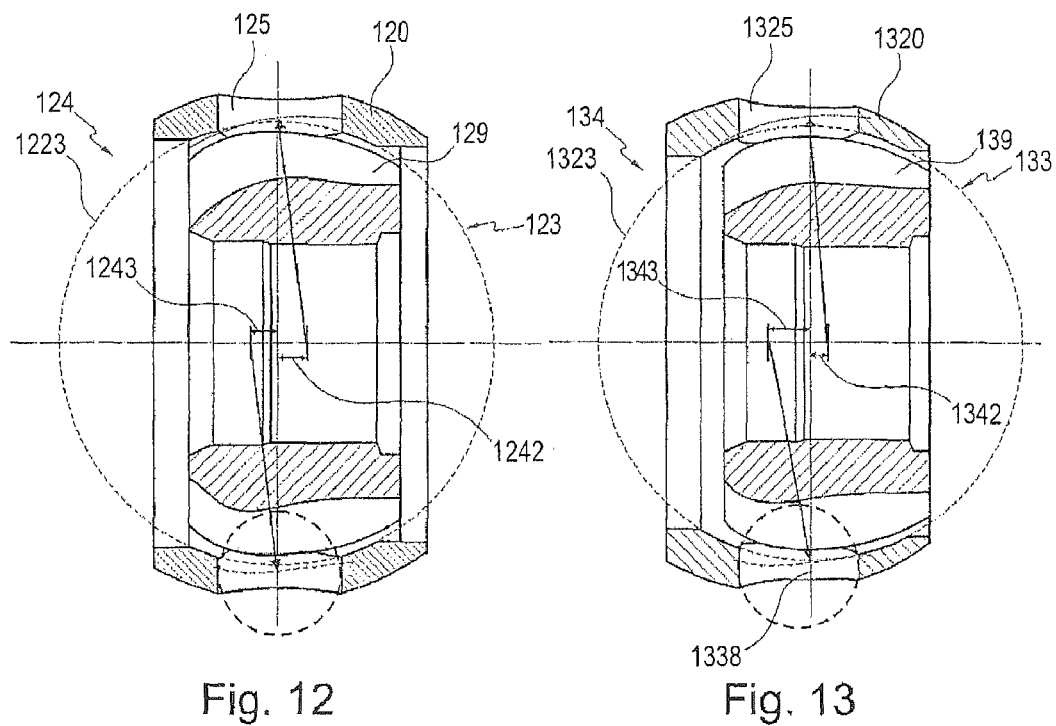
FIG. 12 shows a combination of a joint inner part and cage with identical inner ball track offset and cage.
FIG. 13 shows a variant composed of a joint inner part and cage which is modified according to the disclosure compared to FIG. 12.

A further comparison of the prior art and of an embodiment variant of a combination of the cage 20 and joint inner part 9 can be seen in FIGS. 12 and 13. In FIG. 12, the joint inner part 129 has a second inner ball track offset 1243 and a first inner ball track offset 1242 which are of essentially the same size. In a configuration of the cage 1220 with cage offset according to FIG. 13, this is then adapted by virtue of the fact that the second inner ball track offset 1343 is enlarged by half the cage offset, while the first inner ball track offset 1342 is reduced in size by half the cage offset. As a result, the ball plane 1338 is moved further in the direction of the opening side 134.

Figure 14:
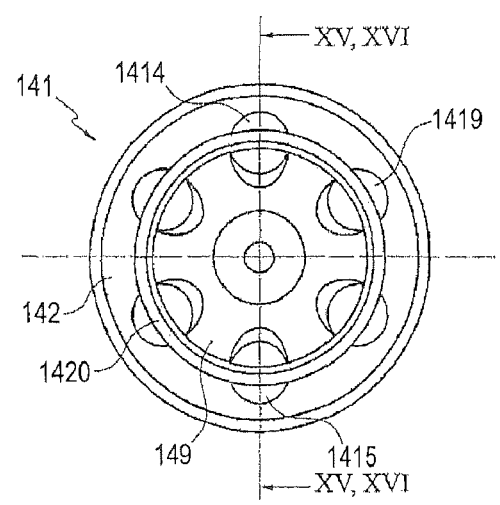
FIG. 14 shows an embodiment variant of a constant velocity joint in a plan view.

FIG. 14 illustrates a plan view of the opening side of an embodiment variant of the joint arrangement 141. The illustrated counter track joint comprises a joint outer part 142 and a joint inner part 149, between which the first track pairs 1414 and second track pairs 1415 are arranged spaced apart from one another and alternating with one another. The balls 149 which are positioned in the track pairs are held in position in the cage 1420. The embodiment variant illustrated here is a counter track constant-velocity joint which is embodied with six track pairs so that the first track pairs 1414 and the second track pairs 1415 respectively lie opposite one another. The design of the joint outer part 142 and of the joint inner part 149 will be illustrated in the two following figures.

Figure 15:
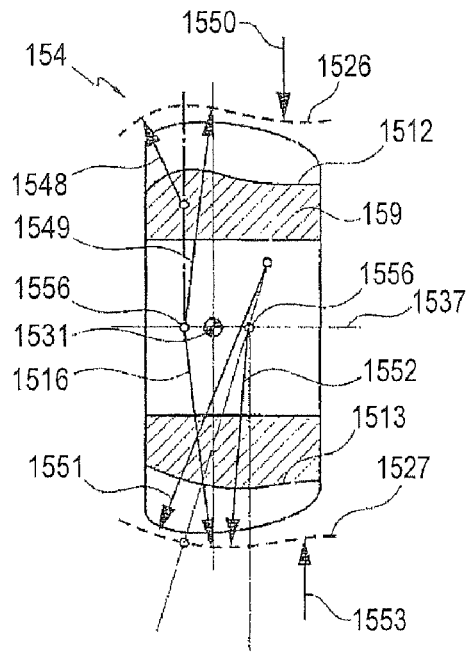
FIG. 15 shows a sectional view through a joint inner part as indicated in FIG. 14.

FIG. 15 accordingly shows a section along the plane indicated by XV-XV in FIG. 14. The joint inner part 159 has (at the top) a first inner ball track 1512 and (at the bottom) a second inner ball track 1513 which is embodied differently therefrom. The design of the first inner ball track 1512 and of the second inner ball track 1513 will now be illustrated separately. For both ball tracks, the path of the ball centre points during the rolling as the joint inner part 159 articulates is also illustrated by dashed lines. The first track centre line 1526 has here an essentially S-shaped profile, with the first track center line 1526 being firstly formed with a small front first inner radius 1548 of curvature, then with a relatively large central first inner radius 1549 of curvature (which defines the first inner ball track offset here), and finally a rear first inner radius 1550 of curvature. The second track center line 1527 has in turn, starting from the opening side 154, firstly a large front second inner radius 1551 of curvature, then a central, second inner radius 1552 of curvature (which defines the second inner ball track offset here), and finally an opposed rear, second inner radius 1553 of curvature. The first inner ball track offset is formed with the center point 1556 of the first inner central radius 1549 of curvature. The second inner ball track offset is formed with the center point 1556 of the second inner central radius 1552 of curvature.

Figure 16:
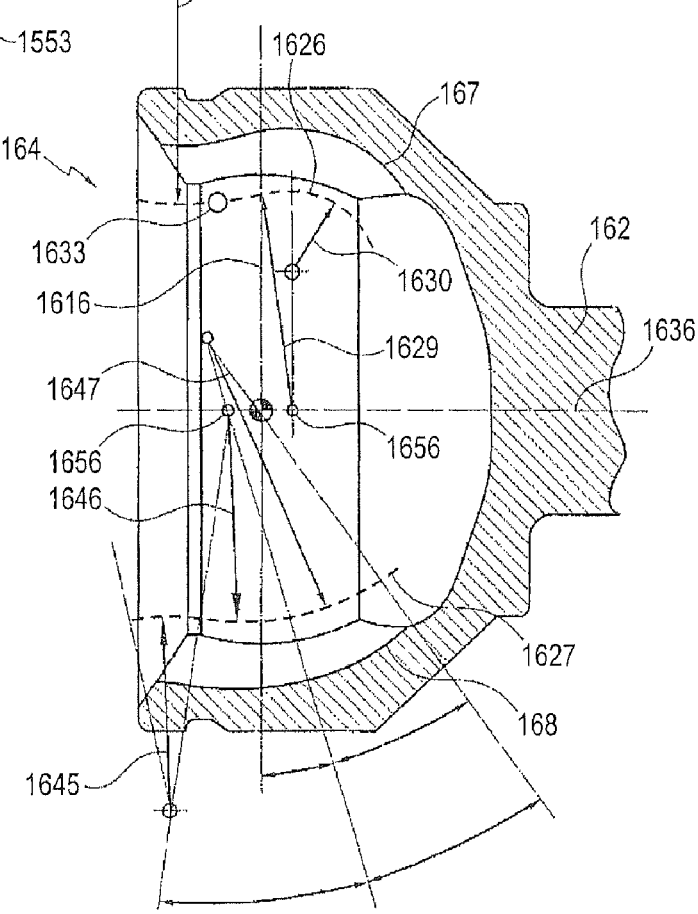
FIG. 16 shows a section through a joint outer part as indicated in FIG. 14.

A joint outer part 152 which fits the joint inner part 159 from FIG. 15 is illustrated in FIG. 16. The section which is illustrated here corresponds to the sectional profile indicated by XVI-XVI in FIG. 14.

In the joint outer part 162, the first outer ball track 167 is indicated at the top, and the second outer ball track 168 at the bottom. The first track centre line 1626 and the second track centre line 1627, which describes the profile of the ball centre points as the respective ball track rolls, are indicated again at a corresponding distance to the latter. Starting from the opening side 164, the first track centre line 1626 is composed of a front, first outer radius 1628 of curvature, a central, first outer radius 1629 of curvature (which defines the first outer ball track offset here) and a rear, first outer radius 1630 of curvature. In addition, the track centre line 1626 has a first track turning point 1633.

The second track centre line 1627 which lies opposite comprises, starting from the opening side 164, firstly a front, second outer radius 1645 of curvature, then a central, second outer radius 1646 of curvature (which in turn defines the second outer ball track offset), and a rear, second outer radius 1647 of curvature. The first outer ball track offset is formed with the center point 1656 of the first outer central radius 1629 of curvature. The second outer ball track offset is formed with the center point 1656 of the second outer central radius 1646 of curvature.

We claim:

1. Joint arrangement comprising:
a joint outer part having a connection side, an opening side and a cavity which is bounded by an inner face, as well as first outer ball tracks and second outer ball tracks which extend on the inner face between the connection side and the opening side,
a joint inner part which is positioned in the cavity in the joint outer part and has a connection mechanism for a shaft, which runs in the direction of the opening side of the joint outer part, as well as first inner ball tracks and second inner ball tracks which extend on an outer face,
wherein, on the one hand, in each case a first outer ball track and a first of the inner ball tracks form a first track pair, and, on the other hand, in each case a second outer ball track and a second of the inner ball tracks form a second track pair with one another,
wherein, when the joint arrangement is extended, the first track pair forms a first angle of aperture in a joint center plane towards the connection side of the joint outer part, and the second track pair forms a second angle of aperture in the joint center plane towards the opening side of the joint outer part,
a ball in each track pair,
a cage which is also arranged in the cavity between the joint outer part and joint inner part and has a cage outer sphere with an outer sphere center point and a cage inner sphere with an inner sphere center point, and which has a plurality of cage windows which each hold at least one ball, and
wherein at least the outer sphere center point and the inner sphere center point of the cage are arranged offset with respect to the joint center plane.

2. The joint arrangement according to claim 1, wherein the outer sphere center point is offset in the direction of the opening side of the joint outer part and the inner sphere center point is arranged offset in the direction of the connection side of the joint outer part.

3. The joint arrangement according to claim 2, wherein a first outer ball track offset of the first outer ball track and a second outer ball track offset of the second outer ball track differ by at least 50% and at most 150% of the distance between the outer sphere center point and the inner sphere center point of the cage.

4. The joint arrangement according to claim 2, wherein a first inner ball track offset of the first inner ball track and a second inner ball track offset of the second inner ball track differ by at least 50% and at most 150% of the distance between the outer sphere center point and the inner sphere center point of the cage.

5. The joint arrangement according to claim 1, wherein the first outer ball tracks form a first outer radius of curvature in the joint center plane, and the first inner ball tracks form a first inner radius of curvature in the joint center plane, which radii of curvature each form an identically sized first track offset, and in addition the second outer ball tracks form a second outer radius of curvature in the joint center plane, and the second inner ball tracks form a second inner radius of curvature in the joint center plane, which radii of curvature each form an identically large second track offset.

6. The joint arrangement according to claim 1, wherein absolute values of the first angle of aperture and of the second angle of aperture differ from one another by at most 5 degrees.

7. The joint arrangement according to claim 1, wherein the first track pair forms a first track center line which has a first track turning point.

8. A joint outer part for a joint arrangement, comprising:
an outer joint part which has a connection side, an opening side, a joint outer part axis, a cage center plane and a cavity which is bounded by an inner face, as well as first outer ball tracks and second outer ball tracks which extend on the inner face between the connection side and the opening side,
wherein the first outer ball tracks and the joint outer part axis form a first angle of aperture towards the connection side of the joint outer part in the cage center plane, and the second outer ball tracks and the joint outer part axis form a second angle of aperture towards the opening side of the joint outer part in the cage center plane, and in addition the first outer ball tracks form a first outer radius of curvature in the cage center plane, and the second outer ball tracks form a second outer radius of curvature in the cage center plane, and wherein the center points of which radii of curvature are positioned asymmetrically with respect to a cage sphere plane of the joint outer part.

9. A joint inner part for a joint arrangement, comprising a joint inner part which has a connection side, an opening side, a joint inner part axis, a cage center plane and first inner ball tracks and second inner ball tracks which extend on an outer face, wherein the first inner ball tracks and the joint inner part axis form a first angle of aperture towards the connection side of the joint inner part in the cage center plane, and the second inner ball tracks and the joint inner part axis form a second angle of aperture towards the opening side of the joint inner part in the cage center plane, and in addition the first inner ball tracks form a first inner radius of curvature in the cage center plane and the second inner ball tracks form a second inner radius of curvature in the cage center plane, and wherein the center points of which radii of curvature are positioned asymmetrically with respect to the cage sphere plane of the joint inner part.

* * * * *

UNITED STATES PATENT AND TRADEMARK OFFICE
CERTIFICATE OF CORRECTION

| | | |
|---|---|---|
| PATENT NO. | : 8,216,075 B2 | Page 1 of 1 |
| APPLICATION NO. | : 12/521673 | |
| DATED | : July 10, 2012 | |
| INVENTOR(S) | : Thomas Weckerling et al. | |

It is certified that error appears in the above-identified patent and that said Letters Patent is hereby corrected as shown below:

Title page, item 57

IN THE ABSTRACT:

Line 4, please change --centripetal-- to center

Signed and Sealed this
Eleventh Day of September, 2012

David J. Kappos
*Director of the United States Patent and Trademark Office*